(12) United States Patent
    Palella et al.

(10) Patent No.: US 10,877,059 B2
(45) Date of Patent: *Dec. 29, 2020

(54) POSITIONING APPARATUS COMPRISING AN INERTIAL SENSOR AND INERTIAL SENSOR TEMPERATURE COMPENSATION METHOD

(71) Applicant: STMicroelectronics S.r.l., Agrate Brianza (IT)

(72) Inventors: Nicola Matteo Palella, Rivolta d'Adda (IT); Leonardo Colombo, Lecco (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,656

(22) Filed: Apr. 29, 2019

(65) Prior Publication Data

US 2020/0292570 A1    Sep. 17, 2020

Related U.S. Application Data

(63) Continuation of application No. 14/656,408, filed on Mar. 12, 2015, now Pat. No. 10,317,421.

(30) Foreign Application Priority Data

Mar. 31, 2014    (IT) .............................. MI2014A0557

(51) Int. Cl.
    *G01P 1/00*     (2006.01)
    *G01P 15/14*    (2013.01)
    (Continued)

(52) U.S. Cl.
    CPC .......... *G01P 1/006* (2013.01); *G01C 19/5621* (2013.01); *G01C 19/5656* (2013.01);
    (Continued)

(58) Field of Classification Search
    None
    See application file for complete search history.

(56) References Cited

U.S. PATENT DOCUMENTS 6,401,036 B1   6/2002   Geier et al.
6,577,952 B2   6/2003   Geier et al.
(Continued)

OTHER PUBLICATIONS

Xiaoji Niu, Fast Thermal Calibration of Low-Grade Inertial Sensors and Inertial Measurement Units, Sensors 2013, 13, 12192-12217; doi:10.3390/s130912192, Published: Sep. 12, 2013, ISSN 1424-8220. (Year: 2013).*

(Continued)

*Primary Examiner* — Tung S Lau
(74) *Attorney, Agent, or Firm* — Seed IP Law Group LLP

(57) ABSTRACT

A positioning apparatus includes: a reference device configured to provide a measured current motion angle of a vehicle; an inertial sensor configured to provide a current input angular rate of the vehicle and associated with at least one inertial sensor behavior parameter dependent on inertial sensor temperature; a temperature sensor configured to provide an input temperature variation of the inertial sensor on a time interval; and a digital estimator configured to recursively computing an estimated current motion angle of the vehicle and at least one previously estimated inertial sensor behavior parameter as function of: the measured current motion angle, a previously estimated motion angle, the current input angular rate, and the input temperature variation.

30 Claims, 5 Drawing Sheets

(51) Int. Cl.
*G01C 19/5621* (2012.01)
*G01C 19/5656* (2012.01)
*G01C 19/5684* (2012.01)
*G01C 19/5712* (2012.01)
*G01C 21/16* (2006.01)
*G01C 25/00* (2006.01)
*G01S 19/49* (2010.01)

(52) U.S. Cl.
CPC ..... *G01C 19/5684* (2013.01); *G01C 19/5712* (2013.01); *G01C 21/165* (2013.01); *G01C 25/00* (2013.01); *G01P 15/14* (2013.01); *G01S 19/49* (2013.01)

(56) References Cited

U.S. PATENT DOCUMENTS

| | | | |
|---|---|---|---|
| 8,065,074 B1 * | 11/2011 | Liccardo | G01C 21/165 |
| | | | 701/480 |
| 8,583,371 B1 | 11/2013 | Goodzeit et al. | |
| 10,317,421 B2 * | 6/2019 | Palella | G01P 1/006 |
| 2004/0259651 A1 * | 12/2004 | Storek | A63B 69/3632 |
| | | | 473/131 |
| 2005/0046584 A1 | 3/2005 | Breed | |
| 2006/0113537 A1 | 6/2006 | Krulevitch et al. | |
| 2006/0167595 A1 | 7/2006 | Breed et al. | |
| 2006/0217864 A1 | 9/2006 | Johnson et al. | |
| 2007/0032950 A1 | 2/2007 | O'Flanagan et al. | |
| 2007/0085697 A1 | 4/2007 | Breed | |
| 2007/0086624 A1 | 4/2007 | Breed et al. | |
| 2009/0058593 A1 | 3/2009 | Breed | |
| 2014/0074424 A1 | 3/2014 | Pham et al. | |

OTHER PUBLICATIONS

Niu et al., "Fast Thermal Calibration of Low-Grade Inertial Sensors and Inertial Measurement Units," *Sensors* 13:12192-12217, 2013.

Woodman, "An introduction to inertial navigation," Technical Report, University of Cambridge Computer Laboratory, Aug. 2007, 37 pages.

* cited by examiner

POSITIONING APPARATUS COMPRISING AN INERTIAL SENSOR AND INERTIAL SENSOR TEMPERATURE COMPENSATION METHOD

BACKGROUND

Technical Field

The present disclosure relates to positioning systems (such as, navigation systems) comprising inertial sensors, such as an example, mixed GNSS and Dead Reckoning navigation systems.

Description of the Related Art

Global navigation satellite systems, GNSSs, include constellations of earth orbiting satellites that constantly transmit orbit data and ranging signals to receivers. An example of a GNSS is the Global Positioning Systems (GPS). A GPS receiver receives the satellite signal information from at least four satellites and calculates the receiver position by measuring the range of the receiver from each used satellite and determining the accurate position of each used satellite in a suitable reference coordinate system.

However, there are many environmental situations that cause an attenuation of the received satellites signal. Low signal strength conditions can occur in challenging environments such as urban canyons, under foliage, inside tunnels etc.

GNSS systems can be aided by inertial sensors in order to provide the receiver position even in conditions where satellite signals are not available. Particularly, so called Dead Reckoning (DR) techniques are known to determine vehicle position by employing inertial sensors, such as accelerometers and gyroscopes, and odometers.

The recent introduction of gyroscopes manufactured in MEMS (Micro Electro Mechanical Systems) technology has decreased the sensor costs.

However, in high-accuracy applications such like DR, raw signal outputted by MEMs sensors cannot be used directly, because it embeds intrinsic error factors that need to be compensated. The compensation process is commonly known as calibration in which a sensor can be modelled using one or more calibration parameters, whose behavior across device lifetime can be influenced by different factors (e.g., aging, environmental conditions).

BRIEF SUMMARY

One parameter in inertial sensor performance is the so-called ZRL, whose dependency on thermal drifts is significant. The applicant observes that an efficient and cost saving method allowing a thermal drift compensation in inertial sensors (e.g., MEMS gyroscopes) would facilitate employing this type of sensor in positioning applications.

In an embodiment, a positioning apparatus comprises: a reference device configured to provide a measured current motion angle ($\vartheta_{GNSS}$; $\vartheta_R$) of a vehicle; an inertial sensor configured to provide a current input angular rate (v(t)) of the vehicle and associated with at least one inertial sensor behavior parameter ($\tilde{G}(t)$, $\tilde{O}(t)$) dependent on inertial sensor temperature; a temperature sensor configured to provide an input temperature variation ($\Delta T(t)$) of the inertial sensor on a time interval; a digital estimator configured to recursively computing an estimated current motion angle ($\hat{\vartheta}(t)$, $\tilde{X}(t)$) of the vehicle and at least one estimated inertial sensor behavior parameter ($\tilde{G}(t)$, $\tilde{O}(t)$) as function of: the measured current motion angle ($\vartheta_{GNSS}$; $\vartheta_R$), a previously estimated motion angle ($\tilde{X}(t-1)$), the current input angular rate (v(t)), the input temperature variation ($\Delta T(t)$). In an embodiment, the at least one inertial sensor behavior parameter is at least one of the following parameters: inertial sensor sensitivity (G(t), inertial sensor zero-rate level (O(t)). In an embodiment, said motion angle is at least one angle of the group: heading angle, pitch angle, roll angle, a linear combination of at least two of said heading angle, pitch angle and roll angle. In an embodiment, the inertial sensor includes a gyroscope. In an embodiment, the inertial sensor includes a MEMs gyroscope structured to provide the current input angular rate (v(t)). In an embodiment, the reference device comprises a GNSS receiver configured to provide the measured current motion angle ($\vartheta_{GNSS}$). In an embodiment, the reference device comprises a magnetometer sensor configured to provide the measured current motion angle ($\vartheta_R$). In an embodiment, the digital estimator is configured in according to one of the following approach: Least square estimator LSE filter, Kalman filter, extended Kalman filter, Particle Filter. In an embodiment, the digital estimator is an extended Kalman filter comprising: an update section provided with a differential node module configured to receive the measured current motion angle ($\vartheta_{GNSS}$; $\vartheta_R$), a Kalman gain matrix module and a measurement transformation module; a prediction section provided with a sum node, a delay module, a dynamic matrix module and output port configured to provide the estimated current motion angle ($\hat{\vartheta}(t)$). In an embodiment, the Kalman gain matrix module is defined by a Kalman gain matrix comprising a measurement noise; the digital estimator comprises a measurement noise module associated with the GNSS receiver and configured to compute said measurement noise as weighted combination of at least the following quantities: a signal strength computed from GNSS visible satellite signal powers, a Root-mean-square of pseudorange errors; a Root-mean-square of Doppler errors a number of tracked satellites; a Standard Deviation of vehicle position values and vehicle velocity values obtained by the GNSS receiver. In an embodiment, the digital estimator is configured to compute a covariance matrix including a system noise matrix comprising matrix elements; the digital estimator being configured to compute said matrix elements as function of measured vehicle dynamic quantities. In an embodiment, the navigation apparatus is configured to implement a hybrid GNSS and a dead reckoning positioning system. In an embodiment, the digital estimator is further configured to compute said elements as function of parameters provided by said GNSS system. In an embodiment, the apparatus is also configured to operate in at least one of the following applications: Automatic Driver Assistance, Vehicle to Vehicle Communications, Autonomous Pilot and Telematics applications comprising: road tolling, insurance, emergency call.

In an embodiment, an inertial sensor temperature compensation method comprises: providing a measured current motion angle ($\vartheta_{GNSS}$; $\vartheta_R$) of a vehicle from a reference device; providing a current input angular rate (v(t)) of the vehicle from an inertial sensor associated with at least one inertial sensor behavior parameter ($\tilde{G}(t)$, $\tilde{O}(t)$) dependent on inertial sensor temperature; providing an input temperature variation ($\Delta T(t)$) of the inertial sensor on a time interval; computing by a digital estimator at least one estimated inertial sensor behavior parameter ($\tilde{G}(t)$, $\tilde{O}(t)$) as function of: the measured current motion angle $\vartheta_{GNSS}$ $\vartheta_R$, a previously estimated motion angle ($\tilde{X}(t-1)$), the current input angular rate (v(t)), the input temperature variation ($\Delta T(t)$)).

In an embodiment, an apparatus, comprises: an inertial sensor configured to output a current angular rate and associated with at least one inertial sensor behavior parameter dependent on inertial sensor temperature; a temperature sensor configured to output an indication of a time derivative of a temperature of the inertial sensor; and position-estimation circuitry configured to recursively compute an estimated current motion angle of a vehicle and at least one estimated inertial sensor behavior parameter as function of: an indication of a measured current motion angle; a previously estimated motion angle; the current angular rate; and the indication of the time derivative of the temperature. In an embodiment, the at least one inertial sensor behavior parameter comprises at least one of the following parameters: inertial sensor sensitivity; and inertial sensor zero-rate level. In an embodiment, the measured current motion angle comprises one of: a heading angle; a pitch angle; a roll angle; and a linear combination of at least two of said heading angle, pitch angle and roll angle. In an embodiment, the inertial sensor comprises a gyroscope. In an embodiment, the inertial sensor includes a MEMs gyroscope structured to provide the current angular rate. In an embodiment the indication of the measured current motion angle is based on a Global Navigation Satellite System (GNSS) receiver output signal. In an embodiment, the indication of the measured current motion angle is based on a magnetometer sensor output signal. In an embodiment, the position-estimation circuitry comprises at least one of: a Least Square Estimator (LSE) filter; a Kalman filter; an extended Kalman filter; and a particle filter. In an embodiment, the position estimation circuitry comprises an extended Kalman filter including: an update section having a differential node module configured to receive the indication of the measured current motion angle, a Kalman gain matrix module and a measurement transformation module; and a prediction section having a sum node, a delay module, a dynamic matrix module and output configured to provide the estimated current motion angle. In an embodiment, the Kalman gain matrix module receives a measurement noise indicator; the position-estimation circuitry comprises a measurement noise module associated with a Global Navigation Satellite System (GNSS) receiver and configured to compute said measurement noise indicator as a weighted combination of: a signal strength computed from GNSS visible satellite signal power; a Root-mean-square of pseudorange errors; a Root-mean-square of Doppler errors; a number of tracked satellites; a Standard Deviation of vehicle position values; and vehicle velocity values received from the GNSS receiver. In an embodiment, the position-estimation circuitry is configured to compute a covariance matrix including a system noise matrix and to compute elements of the system noise matrix as function of measured vehicle dynamic quantities. In an embodiment, the position-estimation circuitry is configured to compute said elements as function of parameters provided by a GNSS receiver. In an embodiment, the position-estimation circuitry is configured as to generate position information based on Global Navigation Satellite System (GNSS) signals and dead-reckoning positioning system signals. In an embodiment, the apparatus comprises circuitry configured to provide at least one of: Automatic Driver Assistance; Vehicle to Vehicle Communications; and Autonomous Pilot and Telematics services.

In an embodiment, a system comprises: motion angle measurement circuitry configured to generate at least one indication of a measured current motion angle; an inertial sensor configured to output a current angular rate and associated with at least one inertial sensor behavior parameter dependent on inertial sensor temperature; a temperature sensor configured to output a time derivative of a temperature of the inertial sensor; and position-estimation circuitry configured to recursively compute an estimated current motion angle of a vehicle and at least one estimated inertial sensor behavior parameter as function of: the at least one indication of a measured current motion angle; a previously estimated motion angle; the current angular rate; and the time derivative of the temperature. In an embodiment, the measured current motion angle comprises at least one of: a heading angle; a pitch angle; a roll angle; and a linear combination of at least two of said heading angle, pitch angle and roll angle. In an embodiment, the inertial sensor comprises a MEMs gyroscope. In an embodiment, the motion angle measurement circuitry comprises a Global Navigation Satellite System (GNSS) receiver. In an embodiment, the position-estimation circuitry comprises at least one of: a Least Square Estimator (LSE) filter; a Kalman filter; an extended Kalman filter; and a particle filter. In an embodiment, the system comprises: a Global Navigation Satellite System (GNSS) receiver; and a dead reckoning positioning system.

In an embodiment, a method comprises: sensing, using an inertial sensor having at least one inertial sensor behavior parameter dependent on inertial sensor temperature, a current angular rate; sensing, using a temperature sensor, a time derivative of a temperature of the inertial sensor; and recursively computing, using one or more processing devices, an estimated current motion angle of a vehicle and at least one estimated inertial sensor behavior parameter as function of: an indication of a measured current motion angle; a previously estimated motion angle; the current angular rate; and the time derivative of the temperature. In an embodiment, the at least one inertial sensor behavior parameter comprises at least one of the following parameters: inertial sensor sensitivity; and inertial sensor zero-rate level. In an embodiment, the method comprises: generating, using the one or more processing devices, vehicle position information based on a Global Navigation Satellite System (GNSS) receiver signal and a dead reckoning positioning system signal.

BRIEF DESCRIPTION OF THE SEVERAL VIEWS OF THE DRAWINGS

Further characteristics and advantages will be more apparent from the following description of an embodiment and of its alternatives given as a way of an example with reference to the enclosed drawings in which.

DETAILED DESCRIPTION

Figure 1:
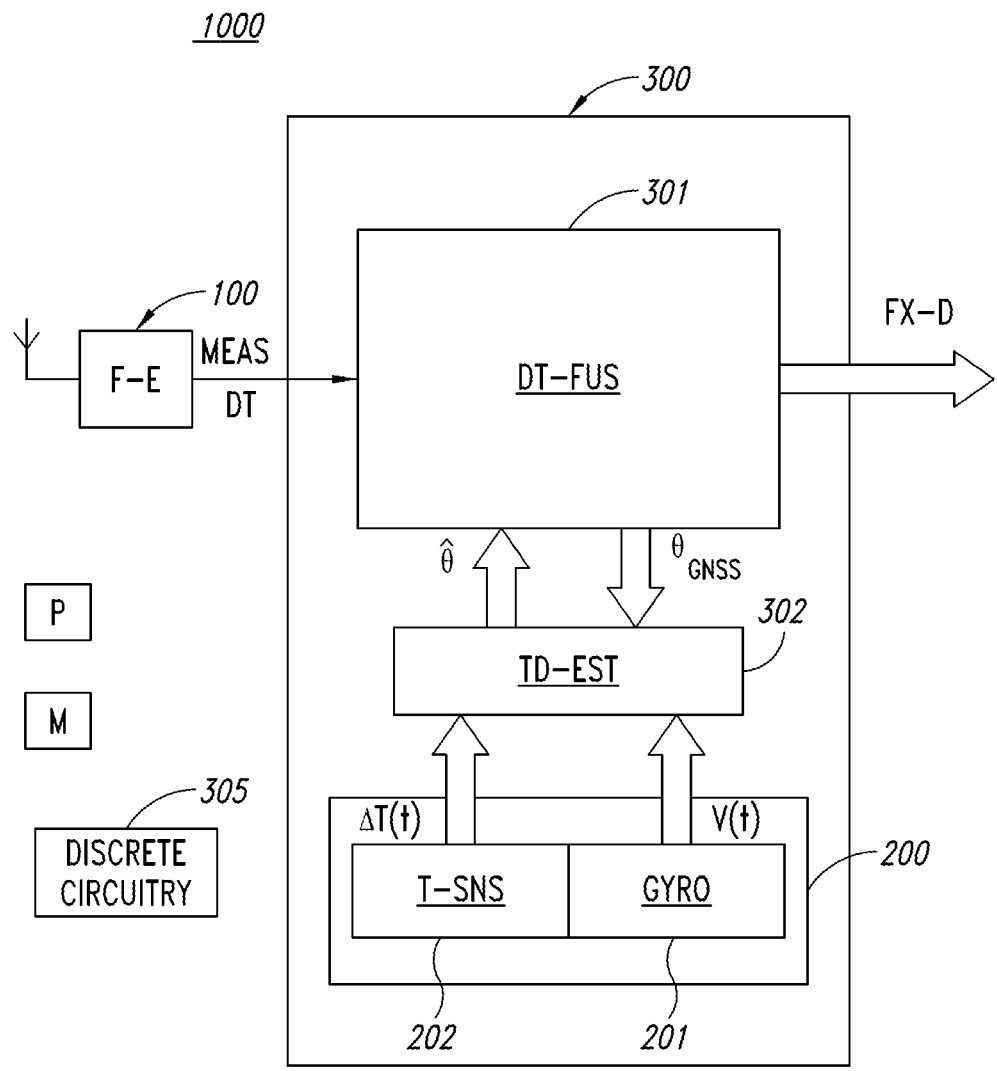
FIG. 1 schematically illustrates an example of a positioning apparatus comprising at least one inertial sensor.

FIG. 1 schematically shows a positioning apparatus 1000 which can be installed on a vehicle, not shown in the figure.

In accordance with the present description, the vehicle can be any means of transport (e.g., cars, trucks, trains etc.) or any other type of mobile objects.

The positioning apparatus 1000 may be a navigation apparatus configured to generate fix data FX-D such as: latitude, longitude, height, speed and heading angle of a vehicle. Particularly, the navigation apparatus 1000 can be a hybrid GNSS (Global Navigation Satellite System) and Dead Reckoning System.

The described navigation apparatus 1000 comprises a GNSS front-end module 100 (F-E), a computational module 300 and a sensing module 200. The sensing module 200 is provided with at least one inertial sensor which is, for example, a gyroscope sensor 201 (GYRO) and at least one temperature sensor 202 (T-SNS). Moreover, in accordance with a particular example, the sensing module 200 can include further inertial sensors, such as accelerometers.

The computational module 300 comprises a data fusion module 301 (DT-FUS) and a thermal drift estimator module 302 (TD-EST).

The GNSS front-end module 100 may be a known module and is configured to acquire data from signals irradiated by satellites belonging to one (or multi) constellation, process these signals and track them. The GNSS front-end module 100 provides measurements MEAS (e.g., Pseudoranges and Doppler) and data DT downloaded by broadcasted navigation message (e.g., satellite positions, velocities and atmospheric corrections).

The gyroscope sensor 201 is structured to provide at least a sensor output signal v(t) proportional to, for example, the angular rate of the rotation of the vehicle around a sensitive axis of the gyroscope sensor 201. In accordance with the particular embodiment described, the sensor output signal v(t) represents a heading rate (also known as "yaw rate"), e.g., angular rate of the rotation of the vehicle around a Z axis perpendicular to the land surface on which vehicle is moving on.

The gyroscope sensor 201 can be a two or three-axis gyroscope so providing further angular rates (e.g., the pitch rate and/or the roll rate) of the vehicle around a X axis and Y axis, e.g., axes perpendicular to each other and laying in a plane perpendicular to the Z axis.

In accordance with an embodiment, the gyroscope sensor 201 is a MEMS Gyroscope Sensor, e.g., an inertial sensor based on MEMS (Micro Electro Mechanical Systems) technology. A MEMS gyroscope sensor provides a yaw rate measurement which is typical affected by a bias. This bias can be statically measured when the MEMS gyroscope sensor is not experiencing any rotation; for this reason this bias is referred as zero-rate level (ZRL). It is observed that an initial value of the zero-rate level can be roughly measured when the MEMS gyroscope sensor is not experiencing any movement, but the zero-rate level cannot be considered constant along time due to a thermal drift behavior. In fact, ZRL is typically proportional to a temperature sensor variation.

The temperature sensor 202 is structured to produce a temperature signal ΔT(t) representing a temperature variation experienced by the gyroscope sensor 201 and may be embedded into the gyroscope sensor itself.

The thermal drift estimator module 302 may be configured to implement a real-time estimation of the thermal drift behavior of the gyroscope sensor 201. In greater detail, the thermal drift estimator module 302 is configured to receive the sensor output signal v(t) provided by the gyroscope sensor 201, the temperature signal ΔT(t) provided by temperature sensor 202 and a heading angle vehicle value $\hat{\vartheta}_{GNSS}$ provided by the data fusion module 301 to provide an estimated heading angle and/or to estimate the thermal drift behavior of the gyroscope sensor 201.

In accordance with the described embodiment, the thermal drift estimator module 302 is configured to implement the estimation of the thermal drift behavior gyroscope sensor 201 with reference to the heading angle of vehicle but it can be configured to estimated thermal drift behavior with reference to other motion angles such as the pitch and/or the roll angles.

The data fusion module 301 is configured to compute an estimation of the vehicle position, velocity and time on the basis of the measurements MEAS and data DT provided by the GNSS front-end module 100 or, in the so called Dead Reckoning operation, on the basis of further signals (such as estimated heading angle $\hat{\vartheta}$) provided by the thermal drift estimator module 302.

When the Dead Reckoning operation is disabled, the GNSS front-end module 100 and the data fusion module 301 may be configured to operate as a GNSS receiver. The employed GNSS technology may be, as an example, the GPS System (Global Positioning System), the GLONASS System (Global'naya Navigatsionnaya Sputnikovaya Sistema), Galileo System or other kinds of positioning systems based on satellite constellations.

With reference to the operation, the sensor output signal v(t) outputted at time t by the gyroscope sensor 201, in particular by the yaw axis of said gyroscope sensor, can be associated in a unique way to an angular rate $\hat{\vartheta}$(t). The relationship between raw output and angular rate can be modelled by the following equation:

$$\hat{\vartheta}(t)=G(t)(v(t)-O(t)) \quad (1)$$

Wherein, the calibration parameter G(t) is the sensitivity of the gyroscope sensor 201 and the calibration parameter O(t) is the zero-rate level of the of gyroscope sensor 201.

Sensitivity G(t) describes the gain of the gyroscope sensor 201 and can be thought as a scale factor converting gyro signal (which is proportional to an angular velocity) to a conventional unit (e.g., radians per second). The sensitivity G(t) will be also called sensor gain.

The zero-rate level O(t) describes the actual output signal of the gyroscope sensor 201 if there is no angular rate present (for example when device is stopped or moving in a straight forward direction). The initial value of zero-rate level in MEMS sensors is usually different by the one defined by design, and it is usually a function of the physical production process and extensive mechanical stress during mounting on the printed circuit board. After these steps the ZRL may not however be considered constant; the major factors affecting zero-rate level during device's life-cycle are temperature variations and aging.

It can be assumed that the gyroscope sensor 201 shows a linear variation over a relevant temperature range, e.g., from −40° C. to 105° C., of the sensitivity G(t) and the zero-rate level O(t). This assumption is particularly valid for last-generation MEMs sensors.

Accordingly, the variation over temperature of the zero-rate level O(t) can be expressed by a first coefficient $O_{vsT}(t)$ representing offset drifts versus temperature.

The variation over temperature of the sensitivity G(t) can be expressed by a second coefficient $G_{vsT}(t)$ representing sensitivity drifts versus temperature.

By integrating equation (1), the heading angle $\vartheta$ (t) (e.g., angular direction versus north direction) can be expressed by the following equation:

$$\vartheta(t) = \vartheta(t-1) + G(t)(v(t) - O(t))\Delta t \quad (2)$$

Wherein, $\Delta t$ is the time interval between two samples of the gyroscope sensor 201, and the quantity $\vartheta$ (t-1) is the estimated value of the heading angle at a previous time t-$\Delta t$.

The linear relationship of the calibration parameters G(t) and O(t) versus temperature variations can be expressed as:

$$G(t) = G(t-1) + G_{vsT}(t)\Delta T \quad (3)$$

$$O(t) = O(t-1) + O_{vsT}(t)\Delta T \quad (4)$$

Where $\Delta T$ is the temperature variation across the time interval $\Delta t$ and the quantities G(t-1) and O(t-1) represent the sensitivity and zero rate level previous time t-$\Delta t$.

It is observed that, referring to the gyroscope sensor 201 built on MEMS technology the second coefficient $G_{vsT}$ is very small such that its effect on heading estimation can be considered negligible ($G_{vsT}(t) \cong 0$) and so the equation (3) can be expressed as:

$$G(t) = G(t-1) \quad (5)$$

The thermal drift estimator module 302 receives at a current time t the following input values:
- a current heading angle value $\vartheta_{GNSS}$ (t) of the vehicle provided by the data fusion module 301 at the current time t;
- a sensor output signal value v(t) provided by the gyroscope sensor 201 at the current time t;
- a variation temperature signal value $\Delta T(t)$ provided by temperature sensor 202 at the current time t.

Particularly, the thermal drift estimator module 302 is also provided with previous or initial values of the gyroscope sensitivity G(t-1), and of the gyroscope zero-rate level O(t-1).

On the basis of the above mentioned values, the thermal drift estimator module 302 recursively computes a heading angle estimated value $\hat{\vartheta}$ (t) and/or a current estimated gyroscope sensitivity value $\hat{G}(t)$ and a current zero-rate level value $\tilde{O}(t)$, e.g., the first coefficient $O_{vsT}(t)$ which are/is provided to the data fusion module 301. The thermal drift estimator module 302 operates on the basis of the above mentioned expressions (2), (4) and (5).

It is observed that the thermal drift estimator module 302 is designed to estimate the heading angle value $\hat{\vartheta}$ (t) by considering the current heading angle value $\vartheta_{GNSS}(t)$, provided by the data fusion module 301, as a reference value and the sensor output signal value v(t), from which a measured heading angle $\vartheta_{GYRO}(t)$ could be obtained, as a noisy measurement. In other words, the thermal drift estimator module 302 is configured to employ a heading error $\Delta\vartheta = \vartheta_{GNSS}(t) - \vartheta_{GYRO}(t)$ to correct the estimates of calibration parameters G, O and $O_{vsT}$.

Moreover, it is noticed that variation temperature signal value $\Delta T(t)$ provided by temperature sensor 202 allows understanding if a certain heading angle mismatch should be associated to an error affecting one calibration parameter rather than the other. As an example, if temperature is stable ($\Delta T = 0$) $\Delta \vartheta$ can be supposed to be caused entirely by an error on the zero-rate level O, and therefore used to correct it. In case $\Delta T \neq 0$, the error $\Delta\vartheta$ can be thought as consequence of an error in the first coefficient $O_{vsT}$ current value, and therefore used to correct the latter.

The heading angle estimated value $\hat{\vartheta}$ (t) as provided at any interval $\Delta t$ (as an example, every 1 s) is supplied to the data fusion module 301 which can calculate the fix data FX-D according to known computing procedures.

In accordance with an embodiment, the thermal drift estimator module 302 is a digital filter operating on digital values provided by the fusion module 301, the gyroscope sensor 201 and the temperature sensor 202 or obtained by a dedicated analogic-digital conversion module, not shown. Particularly, the thermal drift estimator module 302 can be a Least Square Estimator (LSE) filter or a Kalman filter, such as the extended Kalman filter, or Particles Filters.

Figure 2:
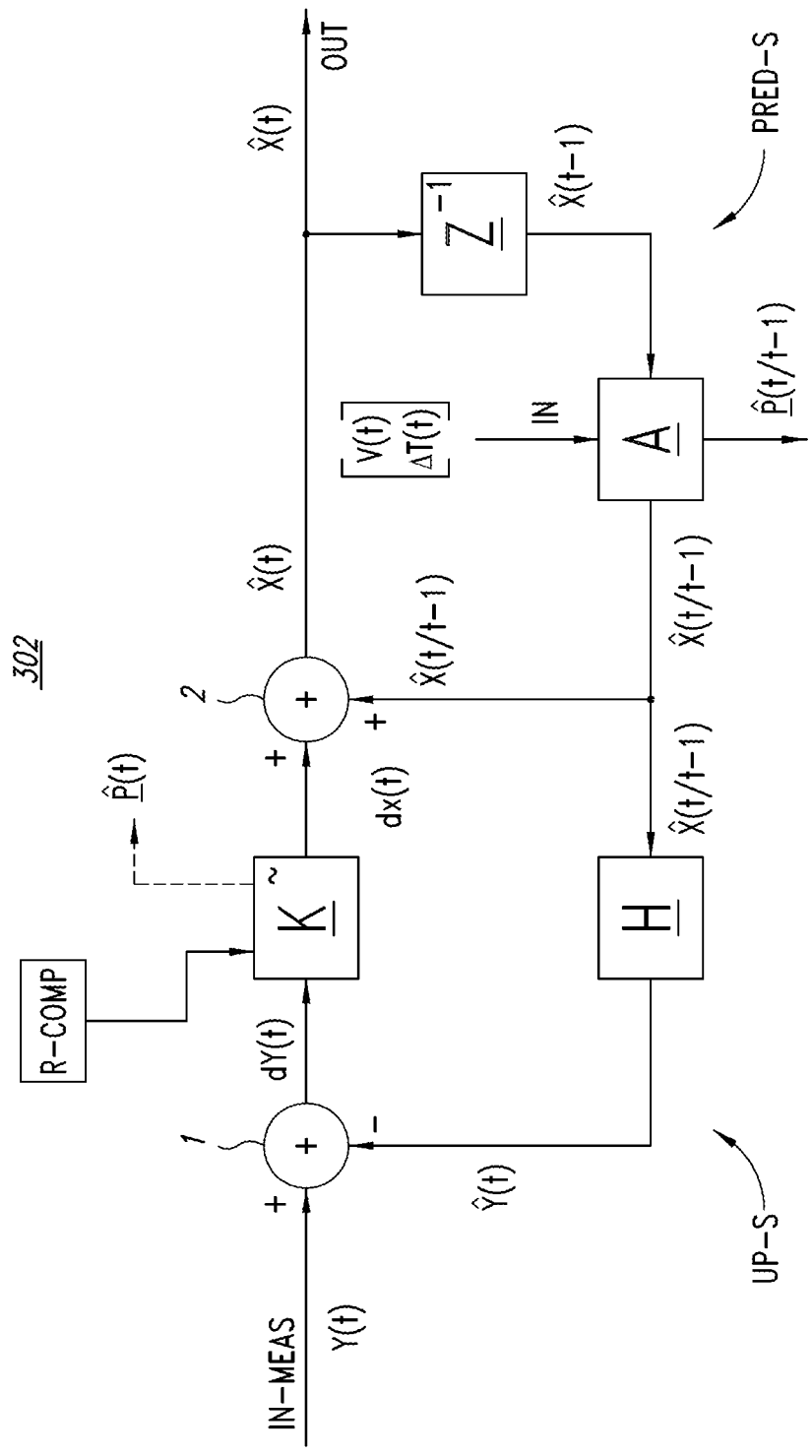
FIG. 2 schematically illustrates an example of thermal drift estimator employable in said positioning apparatus and implemented with an extended Kalman filter approach.

As an example, FIG. 2 refers to an Extended Kalman filter employable to implement the thermal drift estimator module 302.

As is known, an extended Kalman filter is a recursive approach which allows estimating from noisy measurements the variables which describe the state of a dynamic system. Moreover, an extended Kalman filter carries out an estimate of the unknown quantities and also a statistical error about them (referred to as covariance, or P).

In designing the Extended Kalman filter 302, schematically shown in FIG. 2 by functional blocks, a state vector X(t) of the system is defined which can comprises at least the following variables:

$$X(t) = \begin{bmatrix} \vartheta(t) \\ G(t) \\ O(t) \\ O_{vsT}(t) \end{bmatrix} \quad (6)$$

The variables of the state vector X(t) have been already defined in the description above.

For what concerns the state variables, the prediction equation above is simplified through the above mentioned expressions (2) and (4), shown again herein below:

$$\vartheta(t) = \vartheta(t-1) + G(t)(v(t) - O(t))\Delta t \quad (2) \text{ (Heading prediction)}$$

$$O(t) = O(t-1) + O_{vsT}(t)\Delta T \quad (4) \text{ (Offset Prediction)}$$

Extended Kalman filter 302 of FIG. 2 comprises: a measure input IN-MEAS, an update section UP-S, a prediction section PRED-S, an input port IN and an output port OUT.

The update section UP-S comprises a first differential node 1 connected to the measure input IN-MEAS, an input of a Kalman gain matrix module K and an output of a measurement transformation module H.

The prediction section PRED-S comprises a second node 2 connected to an output of the Kalman gain matrix module K, an output of a dynamic matrix module A and an input of a delay module $z^{-1}$ also connected to the output port OUT.

The estimation technique performed by the Extended Kalman filter 302 is essentially based on two steps: prediction and update, which are sequentially performed at every filter computing (e.g., once per second).

As illustrated, the apparatus 1000 comprises one or more processors P, one or more memories M and discrete circuitry 305, which may be used alone or in various combinations to implement the functionality of the various components of the apparatus 1000. For example, a processor P may execute instructions stored in a memory M to implement an extended Kalman filter.

Reference is now made to the prediction performed by the prediction section PRED-S of FIG. 2. At the output port OUT the estimate state vector $\tilde{X}(t)$ is present at a time t:

$$\hat{X}(t) = \begin{bmatrix} \hat{\vartheta}(t) \\ \hat{G}(t) \\ \hat{O}(t) \\ \hat{O}_{vsT}(t) \end{bmatrix} \quad (7)$$

The delay module $z^{-1}$ produces a delayed estimate state vector $\tilde{X}(t-1)$. At the output of the dynamic matrix module A the following predicted state vector is produced:

$$\tilde{X}(t/t-1) = A(t)\tilde{X}(t-1) \quad (8)$$

The dynamic matrix $A(t)$ is obtained by the system linearization, e.g., its terms are formed by the partial derivative of the state equations (2) and (4) versus each one of the state variables defined by the expression (6):

$$A(t) = \frac{\delta x(t)}{\partial x_k} = \begin{bmatrix} 1 & (v(t)-O(t))\Delta t & -G(t)\Delta t & 0 \\ 0 & 1 & 0 & 0 \\ 0 & 0 & 1 & \Delta T \\ 0 & 0 & 0 & 1 \end{bmatrix} \quad (9)$$

As shown in FIG. 2, the dynamic matrix module A receives at the input port IN the sensor output signal value $v(t)$ provided by the sensor gyroscope 201 and the temperature signal value $\Delta T(t)$ provided by the temperature sensor 202.

In accordance with the extended Kalman filter theory a covariance matrix $\tilde{P}(t/t-1)$ is also predicted, using the equation:

$$\tilde{P}(t/t-1) = A(t)\tilde{P}(t)A(t)' + Q \quad (10)$$

Where the term Q is referred as system (or process) noise and is particularly, a 4×4 diagonal matrix having on the diagonal estimates of prediction error selected by the designer.

The predicted state vector $\tilde{X}(t/t-1)$ of equation (8) is supplied to the second node 2 and the measurement transformation module H of the update section UP-S.

The update step, performed by the update section UP-S, corrects the predicted state variables of predicted vector $\tilde{X}(t/t-1)$ using the error between reference and prediction.

Particularly, at the input port IN-MEAS a reference signal value $Y(t)$ is supplied. In accordance with the described example, the reference signal value $Y(t)$ is the current heading angle value $\vartheta_{GNSS}(t)$:

$$Y(t) = \vartheta_{GNSS}(t) \quad (11)$$

The measurement transformation module H provides an estimate predicted heading value $\tilde{Y}(t)$ in accordance with the following expression:

$$\tilde{Y}(t) = H\tilde{X}(t/t-1) = \hat{\vartheta}(t/t-1) \quad (12)$$

Where H is the state to measurement transformation:

$$H = [1\ 0\ 0\ 0] \quad (13)$$

The first node 1 provides a difference $dY(t)$ $$dY(t) = \vartheta_{GNSS}(t) - \hat{\vartheta}(t/t-1) \quad (14)$$

corresponding to the difference of equation $$\Delta\vartheta = \vartheta_{GNSS}(t) - \vartheta_{GYRO}(t) \quad (15)$$

where $\hat{\vartheta}(t/t-1) = \vartheta_{GYRO}(t)$.

According to an embodiment of an extended Kalman filter approach, the Kalman gain matrix $K(t)$ is then calculated as:

$$K(t) = PH'/(HPH' + R) \quad (16)$$

Where: P is the above defined covariance matrix, H' is the transpose matrix of the state to measurement transformation matrix H and R is a measurement noise and is a scalar quantity representing the uncertainty on GNSS heading measurements. An example of evaluation of the measurement noise R will be provided hereinafter.

The Kalman gain matrix module K provides the state correction $dX(t)$ at time t, based on measurement at time t (e.g., a state update):

$$dX(t) = K(t)(Y(t) - \tilde{Y}(t)) \quad (17)$$

Moreover, also by means of the Kalman gain module K, an estimated covariance $\tilde{P}(t)$ is computed according to the equation:

$$\tilde{P}(t) = (I - KH)\tilde{P}(t/t-1) \quad (18)$$

Where, I is the identity matrix and $\tilde{P}(t/t-1)$ is the covariance estimation at time t based on measurement up to time t−1 (see expression (10)).

The estimated state vector $\hat{X}(t)$ is provided by the second node 2 according to the expression:

$$\tilde{X}(t) = \tilde{X}(t/t-1) + dX(t) \quad (19)$$

Where: $\tilde{X}(t/t-1)$ is the state estimation at time t predicted given the one at time t−1 as indicated by the expression (8).

With reference to the measurement noise R, expression (16) representing the uncertainty on GNSS heading measurements it is observed that, while selected by the designer, this parameter allows the extended Kalman filter 302 to estimate the state correctly.

According to an example, the measurement noise R can be computed by a measurement noise module R-COMP represented in FIG. 2 as part of the Extended Kalman filter 302. The measurement noise module R-COMP is configured to evaluate the measurement noise R as an error indicator (conventionally expressed in meters). The measurement noise R is computed from a weighted combination of the following quantities:

a) Signal strength computed as an average value of GNSS visible satellite signal powers, b) Pseudorange error, computed as a Root-mean-square of the Pseudorange errors associated with the employed satellites;

c) Doppler error, computed as a Root-mean-square of the Doppler errors associate with the employed satellites;

d) Number of tracked Satellites;

e) Standard Deviation of GNSS position and velocity.

f) A speed value provided by the GNSS receiver: GNSS speed;

g) A difference between the GNSS speed and a speed value provided by an odometer sensor (odometer speed);

With reference to the above condition a), the Applicants observe that an additional parameter can be considered for the evaluation of the measurement noise R such as a $1^{st}$ order derivative of the computed signal power. Indeed, if the signal power shows high variation values the frequency measures performed by the GNSS receiver are likely not accurate and so the measurement noise R should be greater.

With reference to condition f), the Applicants notice that the accuracy of the heading angle estimation provided by the GNSS receiver is proportional to the user speed. Therefore, the measurement noise R is inversely proportional to the GNSS speed.

With reference to condition g) the Applicants notice that the odometer speed shows high accuracy, so the difference between the GNSS speed and the odometer speed is indicative of the accuracy of the GNSS speed provided by the GNSS receiver and the measurement noise R can be established accordingly.

The parameters to obtain the quantities a)-e) are provided by the GNSS front-end module 100 and by the data fusion module 301 which implement the functionalities of a GNSS receiver.

With reference to the system or process noise matrix Q of the expression (10), an example of its calculation method 600 will be now described. The process noise matrix Q, which is a diagonal matrix, expresses which confidence the Kalman Filter should have on the estimate of any state variable after the prediction process; in other words process noise matrix Q assesses how much the evolution model implemented by the dynamic matrix A should be trusted by the filter. The process noise matrix Q is defined by a first element $Q_O$ and second elements $Q_{OvsT}$ the amounts of which are computed.

Referring to the offset calibration parameters O(t) and $O_{vsT}$(t), an error metric may be used to evaluate if the current calibration performed by the extended Kalman filter 302 is reliable or not. In principle, the logic guiding process noise matrix Q computation is:

1) if the system is calibrated (low error) elements of process noise matrix Q should be decreased, as the prediction model is trustable;
2) if the system is not calibrated (high error) the elements of the process noise matrix Q should be increased representing the fact that prediction model cannot be trusted.

Figure 3:
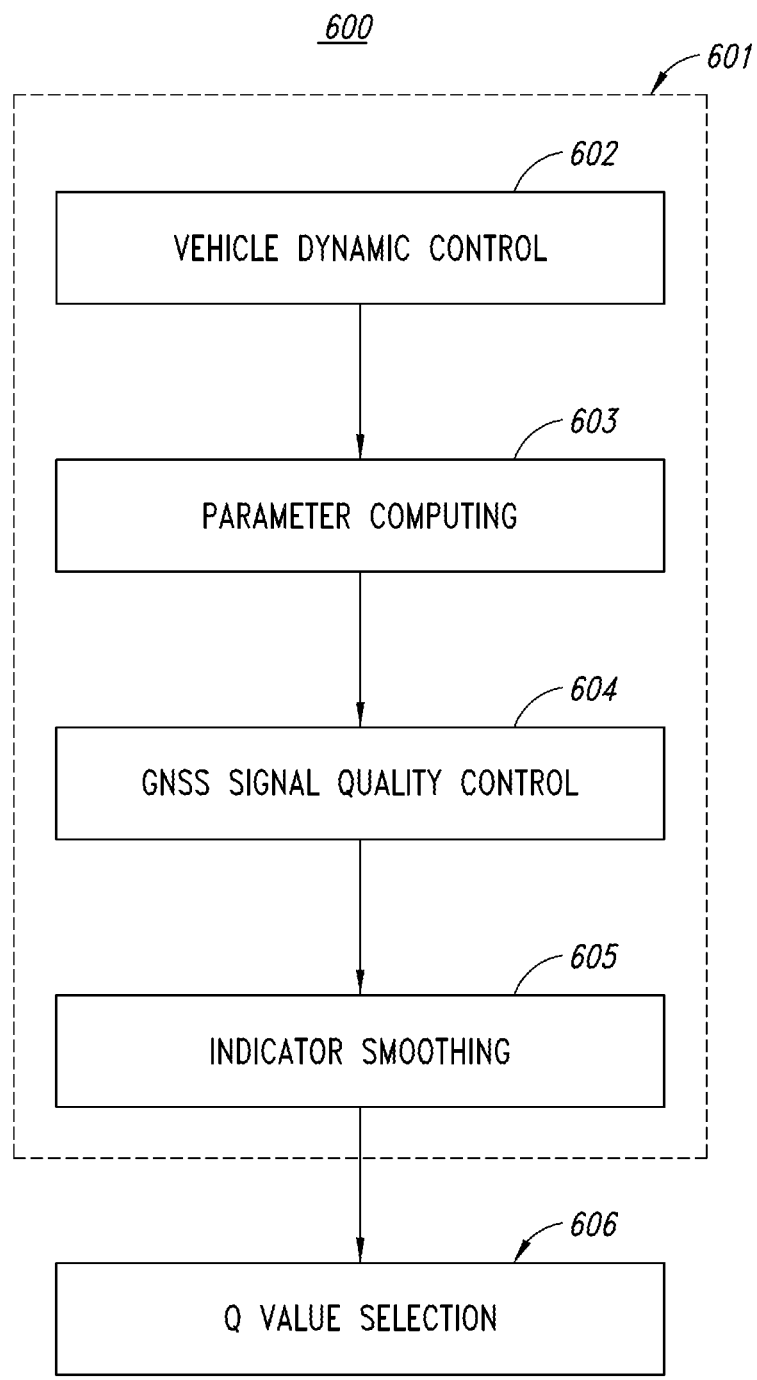
FIG. 3 shows schematically an example of a method for calculating a noise process matrix.

FIG. 3 refers to an example of a process noise matrix Q calculation method 600 comprising: a gyroscope offset error calculation step 601 and process noise value selection step 606. The gyroscope offset error calculation step 601 includes a vehicle dynamic control step 602, a parameters computing step 603, a GNSS signal quality control step 604 and an indicator smoothing step 605.

The vehicle dynamic control step 602 comprises a linear acceleration check step and a user speed check step.

Particularly, in the linear acceleration check step a linear acceleration $dv_k$ is calculated as $1^{st}$ differential of a speed obtained by the Dead Reckoning system implemented in the navigation apparatus 1000. Moreover, in the linear acceleration check step is further checked if the linear acceleration $dv_k$ does not exceed a reference value, such as an example 20 [m/s]:

$$dv_k = |v_k - v_{k-1}| < 20 \text{ [m/s]}$$

In the user speed check step is checked if the user speed is comprised into a reference range, such as an example, the range 0-200 [m/s].

The vehicle dynamic control step 602 allows to evaluate if both the heading angle values $\vartheta_{GNSS}(t)$ and $\vartheta_{GYRO}(t)$ could be considered reliable, and has been performed, particularly, to check if the dynamic range of the application should fall into limits that are reasonable for a land-wheels based application.

If the vehicle dynamic control step 602 is passed, the calculation method 600 proceeds further with the parameter computing step 603.

In the parameter computing step 603, the following GNSS parameters are selected:

first input parameter: $x_1 = \sigma_p^{RMS} \cdot HDOP$ where $\sigma_p^{RMS}$ is the RMS value of the pseudorange error and HDOP is the Horizontal Dilution of Precision;

second input parameter: $x_2 = \sigma_d^{RMS} \cdot HDOP$, where $\sigma_d^{RMS}$ is the RMS value of the Doppler error;

third input value:

$$x_3 = \frac{1}{C} \sum_{c=1}^{C} cn_{0c}$$

which is an average value of the signal strength $cn_{0c}$ among all the tracked satellites.

Figure 4:
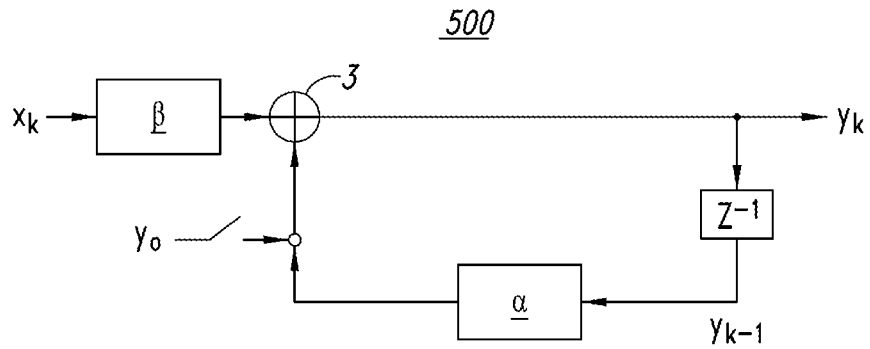
FIG. 4 shows a IIR filter employable in the method of FIG. 3.

Subsequently, in a parameter filtering step, the first $x_1$, the second $x_2$ and the third $x_3$ input parameters, which are raw values derived from the GNSS receiver, are smoothed through a $1^{st}$ order IIR (Infinite Impulse Response) filter 500, an example of which is schematically shown in FIG. 4.

The $1^{st}$ order IIR filter 500 can have the following transfer function:

$$y_k = \frac{\beta}{1 - \alpha z^{-1}} x_k = IIR(x_k)$$

Particularly, according to FIG. 4 filter 500 is provided with an input for an input parameter sample $x_k$, a first modulation module β, a third node 3, an output for an output parameter sample $y_k$, a further delay module $z^{-1}$ and a second modulation module α. Moreover, the IIR filter 500 comprises an input for an initial parameter $y_0$.

The $k^{th}$ output parameter sample $y_k$ is obtained by adding two components: the previous output $y_{k-1}$ (modulated by a coefficient α) of the filter 500 and the new input parameter sample $x_k$ (modulated by the coefficient β=α−1. Since the coefficient a establishes how much the past history will influence the output, it is also called memory of the filter.

The IIR filter 500 is applied separately to process the first $x_1$, the second $x_2$ and the third $x_3$ input parameters and provide corresponding indicators.

Particularly, by filtering the first input parameter $x_1$, a GNSS estimated position accuracy $\in_{\lambda\varphi}$ is obtained:

$$\in_{\lambda\varphi} = IIR(\sigma_p^{RMS} \cdot HDOP)$$

The filtering of the second input parameter $x_2$ produces a GNSS estimated speed accuracy $\in_v$:

$$\in_v = IIR(\sigma_d^{RMS} \cdot HDOP)$$

Feeding the IIR filter 500 with the third input parameter $x_3$ an indication of the carrier to noise ratio $cn_0$ is obtained:

$$cn_0 = IIR\left(\frac{1}{C} \sum_{c=1}^{C} cn_{0c}\right)$$

Then, the GNSS signal quality control step 604 proceeds further with a verification step in which the GNSS estimated position accuracy $\in_{\lambda\varphi}$, the GNSS estimated speed accuracy $\in_v$ and the carrier to noise ratio $cn_0$, together with further indicators, are used to define conditions to be verified in accordance to a plurality of reference/threshold values.

As an example, the conditions to be verified are:

A. the number of tracked satellites (Space Vehicles) should be at least a threshold number (e.g., 4);

B. the $cn_0$ indicator calculated above should be at least a threshold value (e.g., 27 dB/Hz);

C. the satellite signal should be tracked steadily for at least a threshold time (e.g., 3 seconds);

D. the GNSS estimated position accuracy $\in_{\lambda\varphi}$ and GNSS estimated speed accuracy $\in_v$ should fall into reasonable limits (e.g., $\in_{\lambda\varphi} < 40$ [m] and $\in_v < 1$ [m/s]);

E. the GNSS heading angle $\vartheta_{GNSS}(t)$ is a function of the Dopplers measured by GNSS receiver on incoming signal;

the mentioned RMS value of the pseudorange error $\sigma_p^{RMS}$ should be reasonably low (e.g., a $\sigma_p^{RMS}$<1.5 [m/s]);

F. the GNSS average signal strength $$\frac{1}{C}\sum_{c=1}^{C} cn_{0c}$$

should be strong enough, for example, $$\left(\frac{1}{C}\sum_{c=1}^{C} cn_{0c} > 25[dB/Hz]\right);$$

G. since GNSS attitude determination at low dynamics is degraded, a minimum velocity may be used in order to consider GNSS heading valid for the metric computation, e.g., ($\dot{\vartheta}_{GNSS}$>8 [m s])

So, for example, if the above conditions A-G are fulfilled the GNSS signal quality control 604 is considered passed. In other words, if the above conditions A-G are fulfilled the GNSS signal quality is considered good enough to calculate $\Delta\vartheta$ in reliably manner by the thermal drift estimator module 302

If the vehicle dynamic control step 602 and the GNSS signal quality control step 604 are passed, the raw heading angle error $\Delta\vartheta$ may be considered valid for process noise calculation, and it is processed in the indicator smoothing step 605 by further low-pass IIR filter which provides an indicator called gyroscope offset error $\gamma_O$:

$$\gamma_O = IIR(\Delta\vartheta)$$

The further low-pass IIR filter can be analogous to the IIR filter 500 shown in FIG. 4 where $\alpha=1-\beta$. For example, if the vehicle control dynamic control step 602 is not passed the further low-pass IIR filter is used with a $\beta$ value fixed to 0.00, while if both the vehicle dynamic control step 602 and the GNSS signal quality control step 604 are passed $\beta$ is fixed to 0.9. If the vehicle dynamic control step 602 and/or the GNSS signal quality control step 604 are not passed the raw heading angle error $\Delta\vartheta$ is not considered valid for process noise calculation. In this case, the estimation of the heading value based on the GNSS signal is not performed and the pure Dead Reckoning approach can be used to evaluate the heading angle.

In the case in that the gyroscope offset error $\gamma_O$ is calculated the process noise value selection step 606 is performed by analyzing the gyroscope offset error $\gamma_O$.

Figure 5:
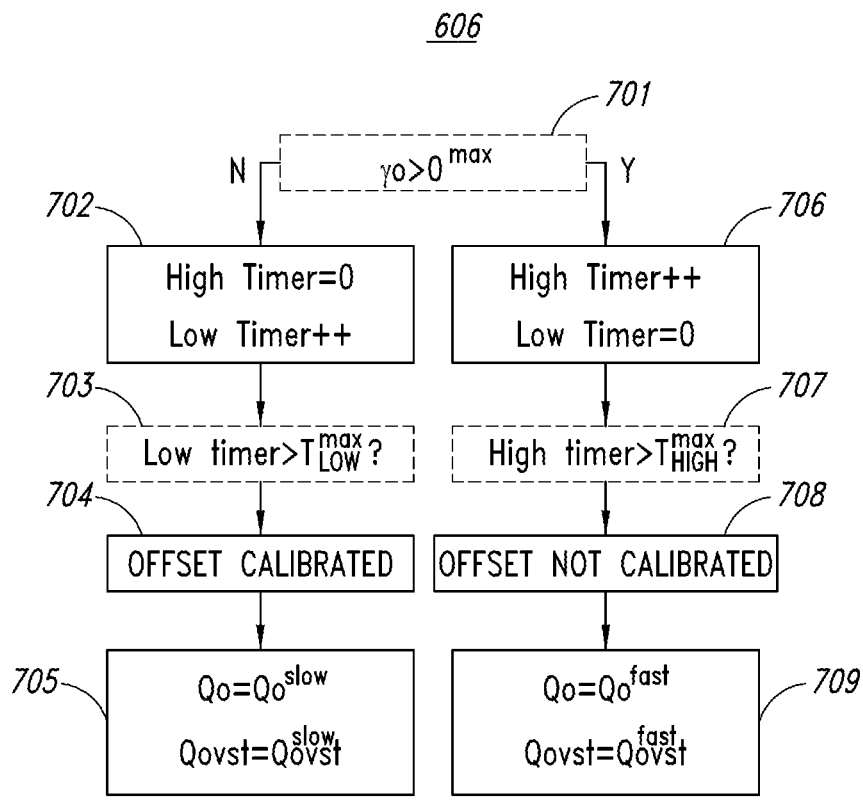
FIG. 5 shows processing steps of an embodiment of the method of FIG. 3.

FIG. 5, schematically shows an example of the process noise value selection step 606.

In a comparison step 701 the gyroscope offset error $\gamma_O$ is compared with a threshold value $O^{max}$ which may represent a pre-established maximum value. If the gyroscope offset error $\gamma_O$ is not higher than the threshold value $O^{max}$ ($\gamma_O \leq O^{max}$) the process noise value selection step 606 proceeds further (branch N) with a first time counting step 702. In the first time counting step 702, the duration of a time interval "Lower timer" in which the relation $\gamma_O \leq O^{max}$ is maintained valid is evaluated.

If, in first a time comparison step 703, the time interval "Lower timer" is higher that a first time threshold value $T_{LOW}^{max}$ ("Lower timer">$T_{LOW}^{max}$) the offset is considered calibrated (first decision step 704). In this case, the elements $Q_O$ and $Q_{OvsT}$ can be respectively set to slow values (first setting step 705):

$$Q_O = Q_O^{slow}$$

$$Q_{OvsT} = Q_{OvsT}^{slow}$$

If the comparison step 701 shows that the gyroscope offset error $\gamma_O$ is higher than the threshold value $O^{max}$ ($\gamma_O > O^{max}$) the process noise value selection step 606 proceeds further (branch Y) with a second time counting step 706. In the second time counting step 706, the duration of a time interval "High timer" in which the relation $\gamma_O > O^{max}$ is maintained valid is evaluated.

If, in second a time comparison step 707, the time interval "High timer" is higher that a second time threshold value $T_{HIGH}^{max}$ ("High timer" $T_{HIGH}^{max}$) the offset is considered to be not calibrated (second decision step 708). In this case, the elements $Q_O$ and $Q_{OvsT}$ can be respectively set to fast values (second setting step 709):

$$Q_O = Q_O^{fast}$$

$$Q_{OvsT} = Q_{OvsT}^{fast}$$

wherein the fast values are, in accordance with the example, greater that the slow values.

It is further observed that even if according to the above description the reference value of the heading angle ($\vartheta_{GNSS}$) provided to the thermal drift estimator module 302 is the one obtained from a GNSS receiver (implemented by the GNSS front-end module 100 and the data fusion module 301), a reference angle value can be alternatively provided by another apparatus or sensor. As an example, a reference heading angle value ($\vartheta_R$) can be obtained from a magnetometer sensor.

Moreover, the described estimation method based on the heading angle can be used to calibrate the gyroscope sensor 201 even if the estimated heading angle itself is not employed by the data fusion module 301 in calculating the position.

The described embodiments allow to avoid a dedicated temperature calibration step of gyroscope sensors during the mass production of each device so producing a cost saving for manufacturers and users of positioning/navigation systems.

Moreover, the runtime estimation/characterization of the temperature behavior, which provides a real-time calibration of the temperature behavior allows also compensating aging effects.

The embodiments above described can be also used for the following applications concerning the automotive field: Telematics (road tolling, insurance, emergency call; Automatic Driver Assistance, Vehicle to Vehicle Communications, Autonomous Pilot.

It is observed that the described embodiments of the positioning apparatus 100 are employable also in case in that the installation of the gyroscope sensor 201 (integrated in a supporting board) is such as the Z axis is not perpendicular to the land surface.

In this case the Z axis suffers a sensitivity loss, and the other axes should be used to recover it. But different axes on the same MEMS gyroscope may have independent thermal behavior, as the silicon parts composing them are physically different. In other words, two axes X and Z have different offset thermal coefficients k1 and k2 (here the symbol "k" has the same meaning of the above mentioned first coefficient "$O_{vsT}$"). It is noticed that in a production scenario, to characterize two thermal constants (or 3, for 3 axis) may be an issue.

It is observed that the positioning apparatus 1000 can be configured, in accordance with a further embodiment, to solve the above indicated problem and perform the sensitivity recovery by estimating a single temperature coefficient which is representative of two (or three) axes at the same.

Figure 6:
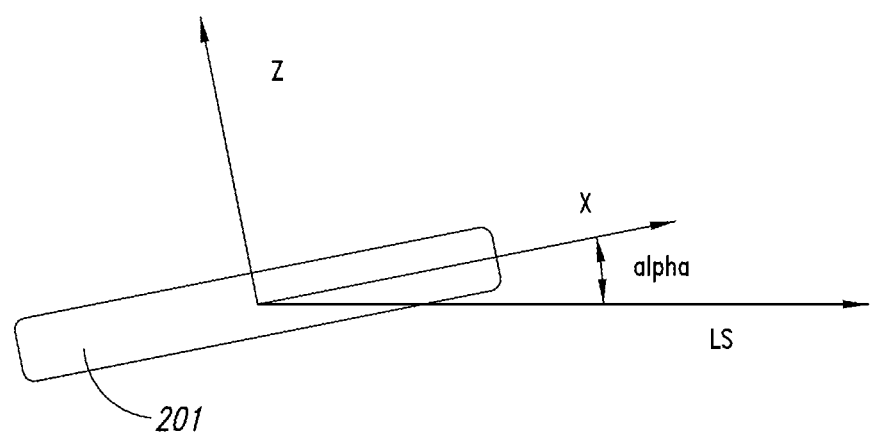
FIG. 6 refers to a two dimensional example and shows a tilted gyroscope sensor.

FIG. 6 refers to a two dimensional example and shows the tilted gyroscope sensor 201 with an X axis having a mismatch (tilt) angle alpha from the land surface LS.

In accordance with this example, the gyroscope sensor 201 provides a first angular rate signal $X_{rate}$ and a second angular rate signal $Z_{rate}$ which are defined in the mismatched reference frame.

The drift estimator module 302 computes an angular rate combined value $Z_{rate'}$ obtained by a linear combination:

$$Zrate'=-\sin(alpha)*Xrate+\cos(alpha)*Zrate=-A*Xrate+B*Zrate \qquad (20)$$

The angle mismatch alpha can be determined, as an example, from signals provided by an accelerometer sensor provided on the vehicle. If the mismatch angle alpha is known, the coefficient A and B of expression (20) are constant values.

The angular rate combined value $Z_{rate'}$ is the yaw rate signal rotated by the mismatch angle alpha, now in the "correct" frame, perpendicular to vehicle (it is 100% sensitivity).

The angular rate combined value $Z_{rate'}$ can be processed by the drift estimator module 302 according to method described above with reference to the sensor output signal v(t) associated with the angular rate $\dot{\vartheta}$(t), so providing a thermal drift compensation.

It is further observed that if the mismatch alpha is equal to 0, e.g., if the gyroscope sensor 201 is in the "perfect" horizontal case, expression (20) gives the result: Zrate'=Zrate. In other words, the compensated rate is exactly equal to the Z one, as expected.

On the contrary, if |alpha|>0, an axis Z sensitivity Vz suffers a sensitivity loss, because part of the angular rotation is sensed by the X axis sensitivity Vx. Instead, using a combined sensitivity Vz' yields having again a 100% sensitivity, because it re-composes the signal formerly spread on X and Z:

(DT is the temperature change on interval ΔT(t)))

The angular rates around the X and Z axes can be modelled by the following expressions:

$$Xrate=Vx-Ox => Ox=Ox+k1*DT$$

$$Zrate=Vz-Oz => Oz=Oz+k2*DT$$

$$Zrate'=A*(Vx-Ox+k1*DT)+B*(Vz-Oz+k2*DT)=$$

$$=A*Vx\ A*Ox+A*k1*DT+B*Vz-B*Oz+B*k2*DT=$$

$$=(A*Vx+B*Vz)-(A*Ox+B*Oz)+(A*k1+B*k2)*DT$$

The quantities Vx and Vz refer to the gyroscope signals and the gyroscope sensitivity. Now, the following definitions are made:

$$(A*Vx+B*Vz)=Vxz$$

$$(A*Ox+B*Oz)=Oxz$$

$$(A*k1+B*k2)=k12$$

So a "virtual" full sensitivity yaw rate signal is:

$$Zrate'=Vxz-Oxz$$

Where the "Virtual offset" Oxz is again a linear function of temperature.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, shift registers, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus, comprising:
    an inertial sensor configured to output a current angular rate and associated with at least one inertial sensor behavior parameter dependent on inertial sensor temperature;
    a temperature sensor configured to output an indication of a time derivative of a temperature of the inertial sensor; and
    position-estimation circuitry configured to recursively compute an estimated current motion angle of a vehicle and an estimated inertial sensor behavior parameter as a function of:
    an indication of a measured current motion angle;
    a previously estimated motion angle;
    the current angular rate; and
    the indication of the time derivative of the temperature.

2. The apparatus according to claim 1 wherein the at least one inertial sensor behavior parameter comprises at least one of the following parameters:
    inertial sensor sensitivity; or
    inertial sensor zero-rate level.

3. The apparatus according to claim 1 wherein the measured current motion angle comprises one of:
    a heading angle;
    a pitch angle;
    a roll angle; or
    a linear combination of at least two of said heading angle, pitch angle and roll angle.

4. The apparatus according to claim 1 wherein the inertial sensor comprises a gyroscope.

5. The apparatus according to claim 1 wherein the indication of the measured current motion angle is based on a Global Navigation Satellite System (GNSS) receiver output signal.

6. The apparatus according to claim 1 wherein the indication of the measured current motion angle is based on a magnetometer sensor output signal.

7. The apparatus according to claim 1 wherein the position-estimation circuitry comprises at least one of:
 a Least Square Estimator (LSE) filter;
 a Kalman filter;
 an extended Kalman filter; or
 a particle filter.

8. The apparatus according to claim 1 wherein the position estimation circuitry comprises an extended Kalman filter including:
 an update section having a differential node module configured to receive the indication of the measured current motion angle, a Kalman gain matrix module and a measurement transformation module; and
 a prediction section having a sum node, a delay module, a dynamic matrix module and output configured to provide the estimated current motion angle.

9. The apparatus according to claim 1 wherein the position-estimation circuitry is configured as to generate position information based on Global Navigation Satellite System (GNSS) signals and dead-reckoning positioning system signals.

10. The apparatus according to claim 1, comprising circuitry configured to provide at least one of:
 Automatic Driver Assistance;
 Vehicle to Vehicle Communications; or
 Autonomous Pilot and Telematics services.

11. The apparatus of claim 1, wherein the position-estimation circuitry is configured to recursively compute a plurality of estimated inertial sensor behavior parameters as a function of:
 the indication of a measured current motion angle;
 the previously estimated motion angle;
 the current angular rate; and
 the indication of the time derivative of the temperature.

12. The apparatus according to claim 4 wherein the inertial sensor includes a MEMs gyroscope structured to provide the current angular rate.

13. The apparatus according to claim 8 wherein:
 the Kalman gain matrix module receives a measurement noise indicator; and
 the position-estimation circuitry comprises a measurement noise module associated with a Global Navigation Satellite System (GNSS) receiver and configured to compute said measurement noise indicator as a weighted combination of:
 a signal strength computed from GNSS visible satellite signal power;
 a Root-mean-square of pseudorange errors;
 a Root-mean-square of Doppler errors;
 a number of tracked satellites;
 a Standard Deviation of vehicle position values; and vehicle velocity values received from the GNSS receiver.

14. The apparatus according to claim 8 wherein the position-estimation circuitry is configured to compute a covariance matrix including a system noise matrix and to compute elements of the system noise matrix as function of measured vehicle dynamic quantities.

15. The apparatus according to claim 14 wherein the position-estimation circuitry is configured to compute said elements as function of parameters provided by a Global Navigation Satellite System (GNSS) receiver.

16. A system, comprising:
 motion angle measurement circuitry configured to generate at least one indication of a measured current motion angle;
 an inertial sensor configured to output a current angular rate and associated with at least one inertial sensor behavior parameter dependent on inertial sensor temperature;
 a temperature sensor configured to output a time derivative of a temperature of the inertial sensor; and
 position-estimation circuitry configured to recursively compute an estimated current motion angle of a vehicle and an estimated inertial sensor behavior parameter as a function of:
 the at least one indication of a measured current motion angle;
 a previously estimated motion angle;
 the current angular rate; and
 the time derivative of the temperature.

17. The system according to claim 16 wherein the measured current motion angle comprises at least one of:
 a heading angle;
 a pitch angle;
 a roll angle; or
 a linear combination of at least two of said heading angle, pitch angle and roll angle.

18. The system according to claim 16 wherein the inertial sensor comprises a MEMs gyroscope.

19. The system of claim 16 wherein the motion angle measurement circuitry comprises a Global Navigation Satellite System (GNSS) receiver.

20. The system of claim 16 wherein the position-estimation circuitry comprises at least one of:
 a Least Square Estimator (LSE) filter;
 a Kalman filter;
 an extended Kalman filter; or
 a particle filter.

21. The system of claim 16, comprising:
 a Global Navigation Satellite System (GNSS) receiver; and
 a dead reckoning positioning system.

22. The system of claim 16, wherein the position-estimation circuitry is configured to recursively compute a plurality of estimated inertial sensor behavior parameters as a function of:
 the indication of a measured current motion angle;
 the previously estimated motion angle;
 the current angular rate; and
 the indication of the time derivative of the temperature.

23. A method, comprising:
 sensing, using an inertial sensor having at least one inertial sensor behavior parameter dependent on inertial sensor temperature, a current angular rate;
 sensing, using a temperature sensor, a time derivative of a temperature of the inertial sensor; and
 recursively computing, using one or more processing devices, an estimated current motion angle of a vehicle and an estimated inertial sensor behavior parameter as a function of:
 an indication of a measured current motion angle;
 a previously estimated motion angle;
 the current angular rate; and
 the time derivative of the temperature.

24. The method of claim 23 wherein the at least one inertial sensor behavior parameter comprises at least one of the following parameters:
   inertial sensor sensitivity; and
   inertial sensor zero-rate level.

25. The method of claim 23, comprising:
   generating, using the one or more processing devices, vehicle position information based on a Global Navigation Satellite System (GNSS) receiver signal and a dead reckoning positioning system signal.

26. The method of claim 23 wherein the recursively computing the estimated current motion angle compensates for a thermal drift of the inertial sensor.

27. A non-transitory computer-readable medium having contents which configure a sensor system to perform a method, the method comprising:
   sensing, using an inertial sensor of the sensor system having at least one inertial sensor behavior parameter dependent on inertial sensor temperature, a current angular rate;
   sensing, using a temperature sensor of the sensor system, a time derivative of a temperature of the inertial sensor; and
   recursively computing an estimated current motion angle of a vehicle and an estimated inertial sensor behavior parameter as a function of:
      an indication of a measured current motion angle;
      a previously estimated motion angle;
      the current angular rate; and
      the time derivative of the temperature.

28. The non-transitory computer-readable medium of claim 27 wherein the at least one inertial sensor behavior parameter comprises at least one of the following parameters:
   inertial sensor sensitivity; and
   inertial sensor zero-rate level.

29. The non-transitory computer-readable medium of claim 27 wherein the method comprises:
   generating vehicle position information based on a Global Navigation Satellite System (GNSS) receiver signal and a dead reckoning positioning system signal.

30. The non-transitory computer-readable medium of claim 27 wherein the recursively computing the estimated current motion angle compensates for a thermal drift of the inertial sensor.

* * * * *